(No Model.)
L. T. DICKSON.
ANCHOR.
No. 279,230.  Patented June 12, 1883.
Fig. 1.
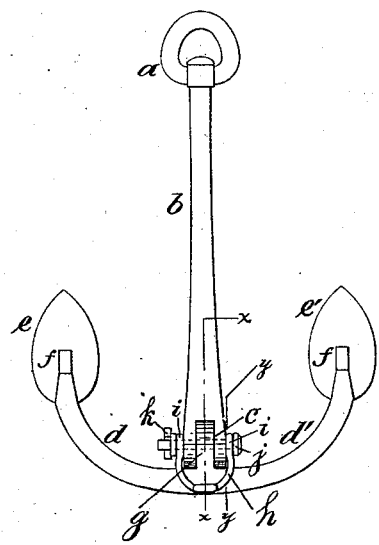
Fig. 2.
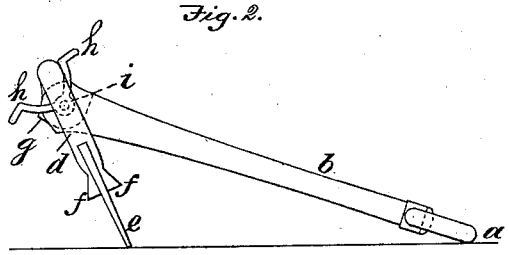
Fig. 3.
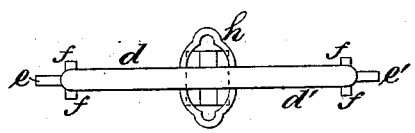
Fig. 4.
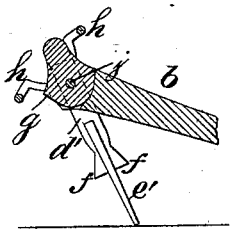
Fig. 5.
WITNESSES:
J. E. Shaw
Harry Falge
INVENTOR:
L. Tyler Dickson

UNITED STATES PATENT OFFICE.

L. TAYLOR DICKSON, OF PHILADELPHIA, PENNSYLVANIA.

ANCHOR.

SPECIFICATION forming part of Letters Patent No. 279,230, dated June 12, 1883.

Application filed February 1, 1883. (No model.)

*To all whom it may concern:*

Be it known that I, L. TAYLOR DICKSON, a citizen of the United States, residing in Philadelphia, Pennsylvania, have invented a new and useful Improvement in Anchors, of which invention the following is a specification.

In the annexed drawings, Figure 1 is a front elevation of the improved anchor; Fig. 2, a side elevation of the same, showing the flukes in position to take hold of the ground; Fig. 3, an elevation of the anchor inverted; Fig. 4, a section on the line $x\ x$ of Fig. 1; Fig. 5, a section on the line $y\ y$ of Fig. 1.

The ring $a$ swivels on the shank $b$.

$c$ is a recess in the crown end of the shank. $d$ and $d'$ are the united arms, and $e\ e'$ the flukes.

A shoulder, $f$, is formed upon each of the flat surfaces of the flukes, presenting a front which, as shown in Figs. 2 and 4, stands at a right angle with the surface of the fluke. It may, however, be undercut without detriment.

$g$ is a lug proceeding from the arms $d\ d'$ inside, at the middle of the crown. This lug is rounded at the end, and it corresponds with and forms a loose fit in the recess $c$. The two prongs of the shank have rounded ends, which are brought close up to the arms at the crutch.

$h$ is an oscillating double shackle, having two eyes, $i$.

$j$ is a bolt passing through an eye in the lug $g$ of the arms, and also through the eyes $i$ of the shackle.

$k$ is a key for fastening the bolt $j$ in place. The arms $d\ d'$ oscillate on the shaft $j$ to either side of the shank to an extent indicated in Figs. 2 and 4, being limited in this movement by the contact of the lug $g$ with the shank at the base of recess $c$, and in either position both flukes engage the ground. The shackle $h$ performs two functions—viz., it presents an eye to be caught in fishing the anchor, and it assists in deflecting the arms, and thus directing the flukes into the ground.

The shoulders $f$, by being brought in contact with the ground as the anchor is dragged, have a like influence in directing the flukes into the ground. The shoulders $f$, instead of being confined to the middle of the surfaces of the flukes, as shown in Fig. 1, may extend across from one side to the other of each of the flat surfaces of the flukes.

The arms $d\ d'$, being pivoted, oscillate by reason of their gravity and freely assume in respect to the shank on one side or the other a position such as is indicated in Figs. 2 and 4; and it will be seen that this result is materially assisted by the close coupling of the shank and arms, as above described, thereby obviating any counterbalancing leverage which the crown would otherwise exert on the extremities of the arms.

I claim—

1. In combination with the shank $b$, forked at its lower end, arms $d\ d'$, and pivot-bolt $j$ thereof, the double shackle $h$, pivoted on said bolt and having free play to oscillate laterally from the arms $d\ d'$, substantially as and for the purpose described.

2. The combination of the shank $b$, forked at its lower end, arms provided with lug $g$, and pivot-bolt $j$, with the double shackle $h$, pivoted on said bolt, having two closed loops and free play to oscillate on each side of the lug $g$, substantially as and for the purpose described.

3. The anchor as a new article of manufacture, consisting of the swiveling ring, recessed shank, double shackle, the arms with their short lug, the bolt or shaft, and the flukes provided with angular shoulders $f$, which project beyond the surfaces of the flukes, all constructed and arranged substantially as set forth.

L. TAYLOR DICKSON.

Witnesses:
J. E. SHAW,
HARRY TALGE.